(12) United States Patent  
Asano et al.

(10) Patent No.: US 7,134,023 B2
(45) Date of Patent: Nov. 7, 2006

(54) DATA TRANSMISSION SYSTEM

(75) Inventors: Tomoyuki Asano, Kanagawa (JP); Yoshitomo Osawa, Kanagawa (JP); Teruyoshi Komuro, Kanagawa (JP); Ryuji Ishiguro, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/112,827

(22) Filed: Apr. 22, 2005

(65) Prior Publication Data

US 2005/0204136 A1 Sep. 15, 2005

Related U.S. Application Data

(63) Continuation of application No. 09/719,449, filed on Dec. 12, 2000, now Pat. No. 6,944,763.

(30) Foreign Application Priority Data

Apr. 13, 1999 (JP) ............................... 11-105965

(51) Int. Cl.
*G06F 1/24* (2006.01)
(52) U.S. Cl. ..................... 713/182; 380/270; 713/168; 713/189
(58) Field of Classification Search ................ 380/270, 380/272, 273
See application file for complete search history.

(56) References Cited

FOREIGN PATENT DOCUMENTS

| EP | 0 875 813 | 11/1998 |
|---|---|---|
| JP | 1 165241 | 6/1989 |
| JP | 4 227951 | 8/1992 |
| JP | 10 4403 | 1/1998 |
| JP | 10 303945 | 11/1998 |
| WO | WO 99 22372 | 5/1999 |

OTHER PUBLICATIONS

Ryuji Ishiguro, "Angou Gijutsu wo Tsukatta IEEE1394 jo no Computer Protection", Proceedings of Sony Research Forum 1997, vol. 7th, pp. 203-208.

Hitachi, Ltd. et al., "5C Digital Transmission Content Protection White Paper", Revision 1.0 http://www.dtcp.com/wp_spec.pdf, Jul. 14, 1998.

Teruyoshi Komuro, "Av wo Multi Media ka Suru IEEE1394 no Genjo to Tenbo", Denshi Gijutsu, Mar. 1, 1999, vol. 41, No. 3, pp. 2-7.

Digital Transmission Content Protection Specification vol. 1 (Information Version), Apr. 12, 1999.

*Primary Examiner*—Thomas R. Peeso
(74) *Attorney, Agent, or Firm*—Frommer Lawrence & Haug; William S. Frommer; Thomas F. Presson

(57) ABSTRACT

A cipher key is generated by first information shared in secrete between a data transmitting unit 10 and a data receiving unit 20, second information derived from duplication control information of transmit data and third information which is time change information shared between the data transmitting unit and the data receiving unit to cipher data by a CPU 12 by using the above-mentioned cipher key to transmit, from the data transmitting unit 10 to the data receiving unit 20, transmit data in which the duplication control information and the time change information are added to the ciphered data.

1 Claim, 9 Drawing Sheets

DATA TRANSMISSION SYSTEM

This is a continuation of application Ser. No. 09/719,449 filed Dec. 12, 2000 now U.S. Pat. No. 6,944,763, the entirety of which is incorporated herein by reference.

TECHNICAL FIELD

This invention relates to a data transmission system and a data transmission method for carrying out transmission of data from a data transmitting unit to a data receiving unit, and a data transmitting apparatus, a data transmitting method, a data receiving apparatus and a data receiving method.

BACKGROUND ART

In recent years, e.g., in homes, there are being popularised systems in which plural AV equipments are connected through digital interface to carry out transmission of digital data such as music information or video information, etc. or record such data. For example, there have been developed AV equipments such as video camera, and Digital Versatile Disk (DVD) (Trade Name) player, etc. having interface of IEEE (The Institute of Electrical and Electronics Engineers, Inc.) 1394 high performance serial bus standard (hereinafter simply referred to as IEEE 1394 serial bus) which is digital bus.

Meanwhile, ordinarily, cinema data, etc. are information having copyright, and it is therefore necessary to prevent an unjust copy by user, etc.

In order to prevent unjust copy by user, etc. e.g., in Mini Disk (MD) (Trade Name) system, there is used a method called SCMS (Serial Copy Management System). SCMS data is information caused to undergo transmission along with music data by digital interface. Such information indicates that music data is any one of data of copy free, copy once allowed and copy prohibited. In the case where mini disk recorder receives music data from digital interface, it detects SCMS, whereby when SCMS is copy prohibited, it does not record music data onto mini disk, when SCMS is copy once allowed, SCMS information is changed into copy prohibited and such recorder records. SCMS data together with received music data, and when SCMS is copy free, SCMS information is caused to be as it is and such recorder records SCMS information along with received music data.

In a manner stated above, in the mini disk system, SCMS is used to prevent that data having copyright is unfairly copied.

Moreover, in such a data transmission system to carry out transmission or recording of digital data such as music information or video information, etc. through digital interface, there is proposed a system of carrying out transmission in the state where duplication control information is stored in packet header of data packet on the transmission path.

This duplication control information is defined by, e.g., 2 bits as follows.

00: No copy limitation
10: Only once copy is allowed
01: Copy is prohibited more than that
11: Copy is primarily prohibited Recording equipment which has received data packet tests (checks) duplication control information in recording data, whereby when the duplication control information indicates "01" or "11", i.e., copy prohibit, the recording equipment does not carry out recording of received data. Moreover, when the duplication control information indicates "10", i.e., copy once allowed, the duplication control information is changed into "01", i.e., changed into prohibit more than that, whereupon the recording equipment records received data with respect to recording media.

In a manner stated above, generation of copy generated from original data is limited.

Further, in order to have compulsory force with respect to the limitation system of the copy generation, there is also used a method of ciphering data to carry out transmission thereof, whereby only maker which makes a contract to manufacture only equipments that observe or obey the copy generation limitation system is allowed to license information necessary for cryptography and decode operation, etc.

Meanwhile, in the system of transmitting data packet on transmission path in the state where duplication control information is stored in the packet header thereof, in the process where packet is transmitted from the transmitting equipment to the receiving equipment, there is the possibility that duplication control information may be altered by any other equipment.

For example, as shown in FIG. 1, even if duplication control information of packet header of data packet is transmitted from the data transmitting unit 1 side at "11" indicating meaning of copy prohibit, when there is duplication control information altering attack during transmission, and the duplication control information is altered into "10" indicating once copy permission, the data receiving unit 2 side which has received this packet cannot recognize that this data is primarily copy-prohibited. Since duplication control information of packet header allows once recording, data would be recorded.

As described above, in the conventional data transmission method, there is the possibility that copy generation management cannot be made.

DISCLOSURE OF THE INVENTION

Therefore, in view of problems of the prior arts as described above, an object of this invention is to provide a data transmission system, a data transmission method, a data transmitting apparatus, a data transmitting method, a data receiving apparatus and a data receiving method which can reliably carry out copy generation management.

The data transmission system according to this invention comprises a data transmitting unit for generating a cipher key on the basis of first information shared in secrete between a data transmitting unit and a data receiving unit, second information derived from duplication control information of data and third information which is time change information shared between the data transmitting unit and the data receiving unit to cipher data by using the cipher key to transmit transmit data in which control information based on the duplication control information and the time change information is added to the ciphered data; and the data receiving unit adapted to receive the control information added and ciphered data sent from the data transmitting unit to generate cipher key on the basis of first information shared in secrete between the data receiving unit and the data transmitting unit, second information derived from the control information of the received data and third information which is time change information shared between the data receiving unit and the data transmitting unit to decode the received data by using the cipher key.

Moreover, in the data transmission method according to this invention, cipher key generated by first information shared in secrete between a data transmitting unit and a data receiving unit, second information derived from duplication control information of transmit data and third information which is time change information shared between the data transmitting unit and the data receiving unit is used to cipher data to carry out transmission thereof.

Further, in the data transmission method according to this invention, at a data transmitting unit, a procedure is taken to generate cipher key on the basis of first information shared in secrete between the data transmitting unit and a data receiving unit, second information derived from duplication control information of data and third information which is time change information shared between the data transmitting unit and the data receiving unit to cipher data by using the cipher key to transmit transmit data in which control information based on the duplication control information and the time change information is added to the ciphered data; and at the data receiving unit, a procedure is taken to receive the control information added and ciphered data sent from the data transmitting unit to generate cipher key on the basis of first information shared in secrete between the data receiving unit and the data transmitting unit, second information derived from the control information of the received data and third information which is time change information shared between the data receiving unit and the data transmitting unit to decode the received data by using the cipher key.

Further, the data transmitting apparatus according to this invention comprises: cipher processing means for generating cipher key on the basis of first information shared in secrete between the data transmitting apparatus and a data receiving apparatus, second information derived from duplication control information of data and third information which is time change information shared between the data transmitting apparatus and the data receiving apparatus to cipher data by using the cipher key; and transmitting means for transmitting transmit data in which control information based on the duplication control information and the time change information is added to the data ciphered by the cipher processing means.

Further, in the data transmitting method according to this invention, a procedure is taken to generate cipher key on the basis of first information shared in secrete between a data transmitting unit and a data receiving unit, second information derived from duplication control information of data and third information which is time change information shared between the data transmitting unit and the data receiving unit to cipher data by using this cipher key to transmit transmit data in which control information based on the duplication control information and the time change information is added to the ciphered data.

Further, the data receiving apparatus according to this invention comprises: receiving means for receiving control information added and ciphered data sent from a data transmitting apparatus, the control information being based on duplication control information and time change information; and decode processing means for generating, with respect to received data received by this receiving means, cipher key on the basis of first information shared in secrete between the data receiving apparatus and the data transmitting apparatus, second information derived from the control information of the received data and third information which is time change information shared between the data receiving apparatus and the data transmitting apparatus to decode the received data by using the cipher key.

In addition, in the data receiving method according to this invention, a procedure is taken to receive control information added and ciphered data sent from a data transmitting apparatus, the control information being based on duplication control information and time change information, to generate, with respect to this received data, cipher key on the basis of first information shared in secrete between a data receiving apparatus and the data transmitting apparatus, second information derived from control information of the received data and third information which is time change information between the data receiving apparatus and the data transmitting apparatus to decode the received data by using the cipher key.

BEST MODE FOR CARRYING OUT THE INVENTION

Explanation will now be given with reference to the attached drawings in connection with the best mode for carrying out this invention.

Figure 1:
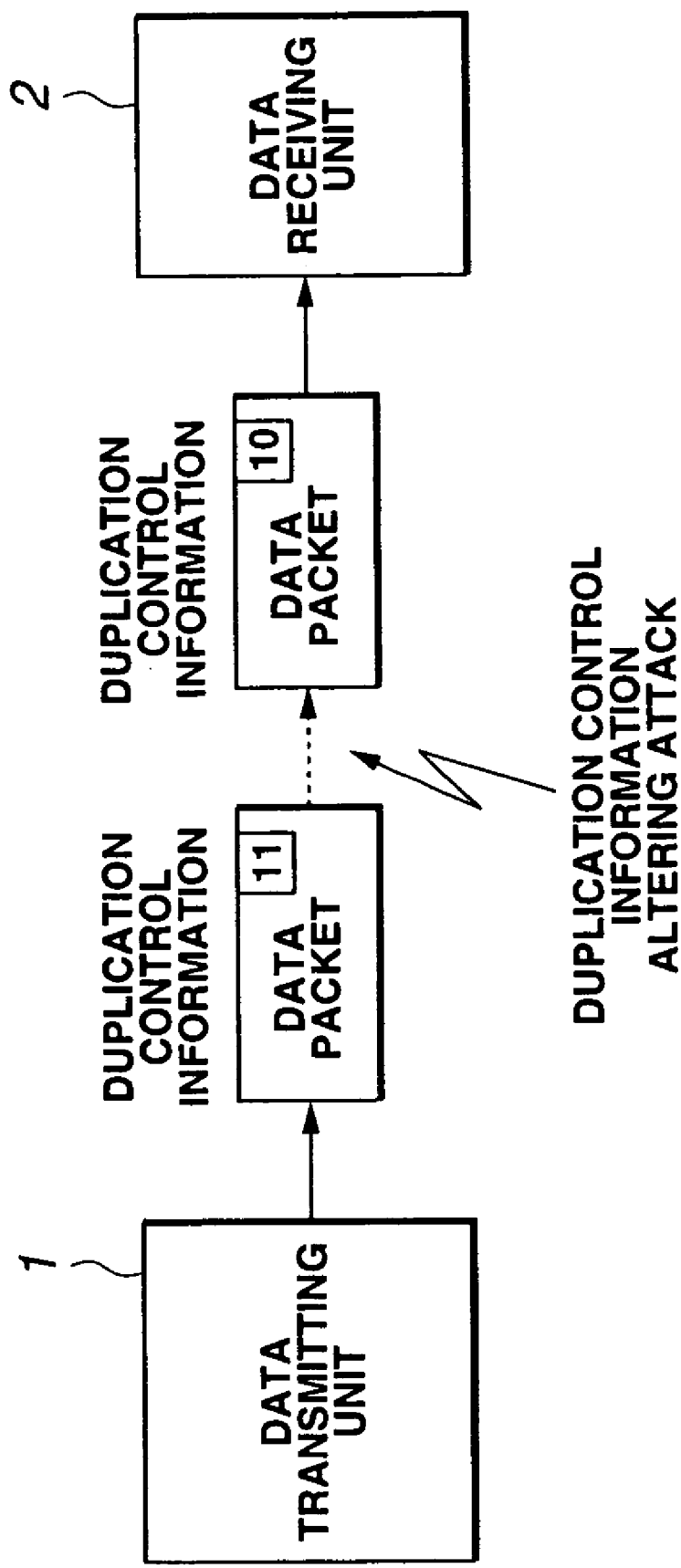
FIG. 1 is a view for explaining effect by duplication control information altering attack.
Figure 2:
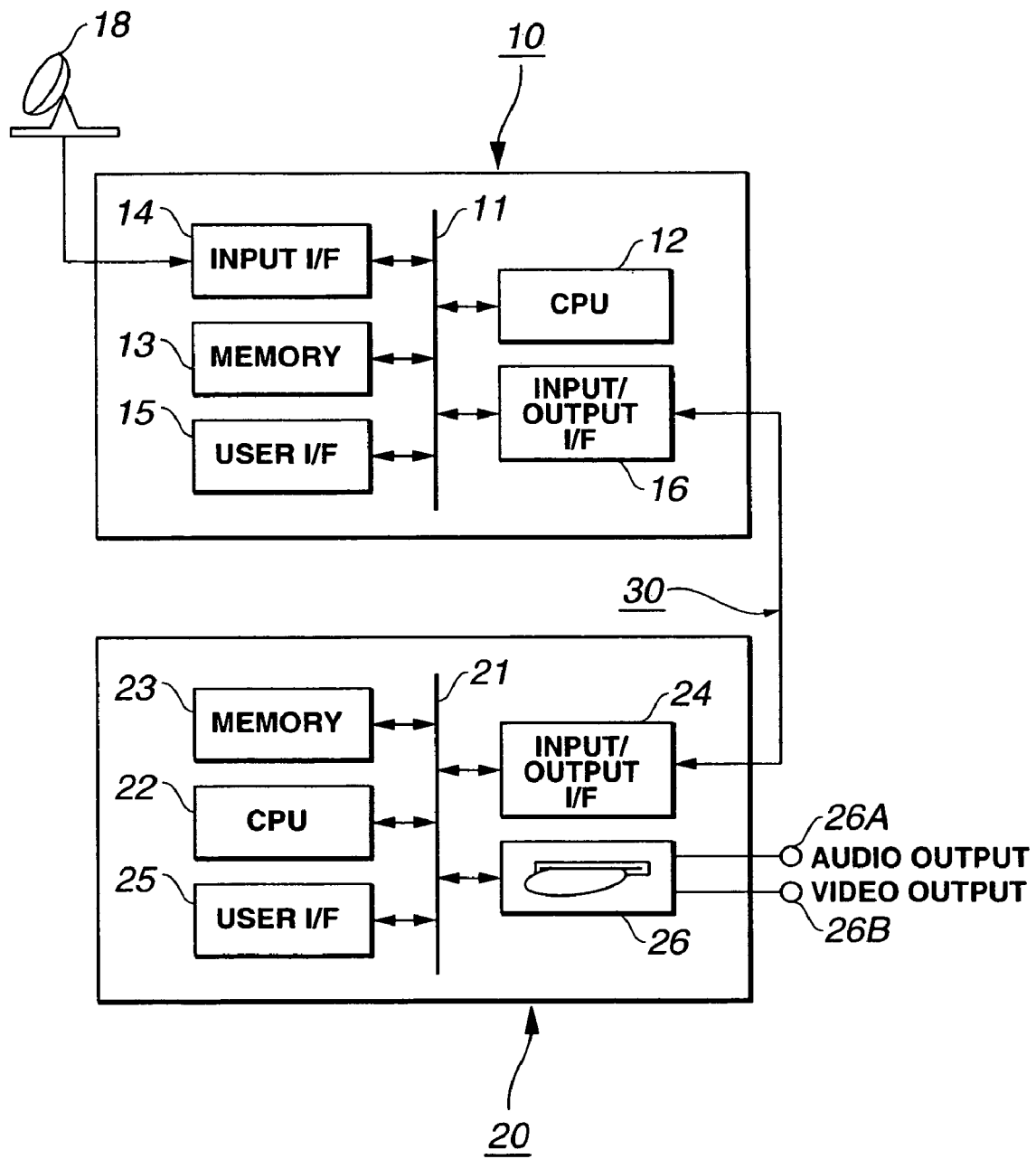
FIG. 2 is a block diagram showing the configuration of data transmission system to which this invention is applied.

This invention can be applied to a data transmission system of the configuration as shown in FIG. 2, for example.

This data transmission system comprises a data transmitting unit 10 and a data receiving unit 20, and is caused to be of the configuration in which the data transmitting unit 10 and the data receiving unit 20 are connected through a transmission path 30.

In the data transmission system of this embodiment, the data transmitting unit 10 is set top box for receiving satellite digital multi-channel broadcast programs sent from, e.g., communication satellite, and is composed of a Central Processing Unit (CPU) 12, a memory 13, an input interface 14, a user interface 15, and an input/output interface 16, etc., which are connected to an internal bus 11. A satellite antenna 18 is connected to the input interface 14. Moreover, the input/output interface 16 is IEEE (The Institute of Electrical and Electronics Engineers, Inc.) 1394 high performance serial bus interface (hereinafter simply referred to as IEEE 1394 interface) which is digital interface, and is connected to a transmission path 30. The transmission path 30 is a transmission path comprised of IEEE 1394 serial bus.

In this data transmitting unit 10, the CPU 12 becomes operative in accordance with a control program stored in the memory 13 to carry out various control operations such as channel selection operation of program, etc. in accordance with operation information inputted through the user interface 15.

Further, this data transmitting unit 10 selects desired channel of satellite digital multi-channel broadcast signal by the input interface 14 to which the receiving antenna 18 is connected to receive video data or music data of desired channel to transmit the received video data or music data as contents data from the input/output interface 16 to the transmission path 30.

In addition, the data receiving unit 20 is a recording unit for recording contents data received by the data transmitting unit 10, i.e., video data or music data onto recording medium such as magnetic tape or magneto-optical disc, etc., and is composed of a Central Processing Unit (CPU) 22, a memory 23, an input/output interface 24, a user interface 25, and a media access section 26, etc. which are connected to an internal bus 21. The input/output interface 24 is IEEE 1394 interface which is digital interface, and the transmission path 30 is connected to the input/output interface 24.

In the IEEE 1394 standard, a transmission operation carried out within the network is called sub action, and the following two kinds of sub actions are prescribed. Namely, as two sub actions, there are defined asynchronous transmission mode for carrying out ordinary data transmission called "Asynchronous data transfer" and synchronous transmission mode which guarantees transmission band called "Isochronous data transfer".

In this data transmission system, Isochronous data transfer which can ensure transmission band is used to carry out transmission of music data between the data transmitting unit 10 and the data receiving unit 20.

Figure 3:
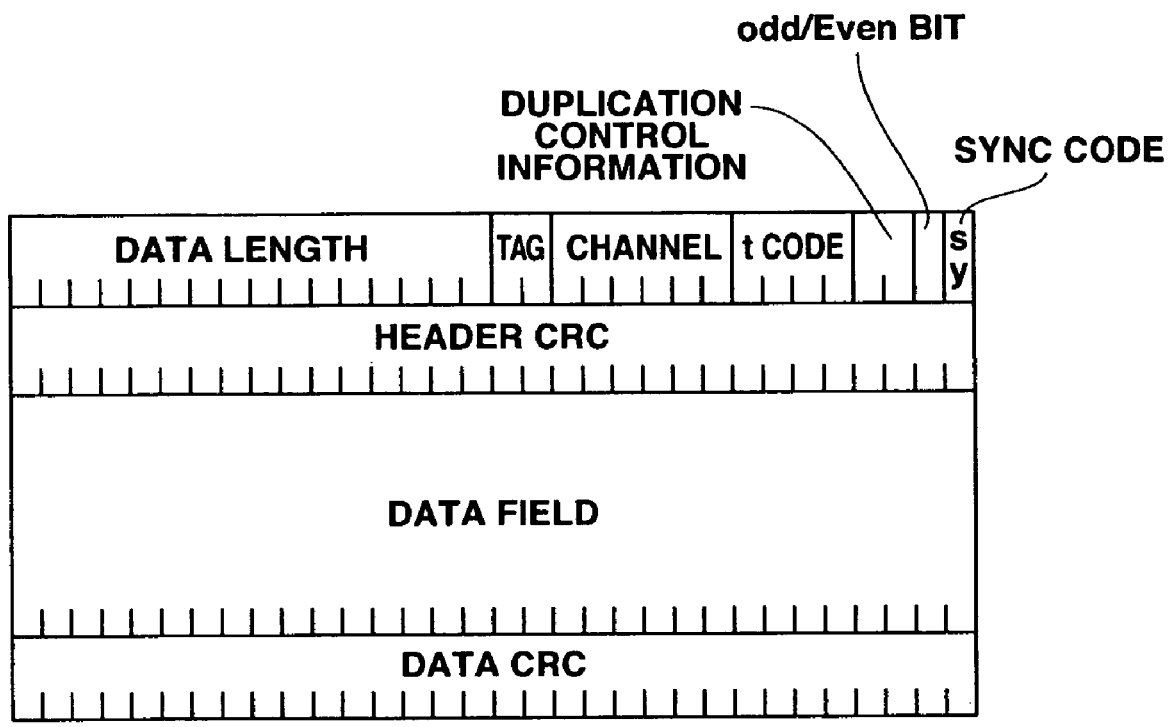
FIG. 3 is a view showing the configuration of transmission frame (isochronous packet) caused to undergo transmission on IEEE 1394 serial bus.

Here, the configuration of packet (isochronous packet) caused to undergo transmission by Isochronous transfer on IEEE 1394 serial bus which is the transmission path 30 is shown in FIG. 3.

Namely, the isochronous packet consists, as shown in FIG. 3, of header, header CRC, data field and data CRC.

The header includes data_length, tag, channel, t code (tcode), duplication control information, Odd/Even bit and synchronous code sy.

The data_length indicates length of data field. The tag indicates format of data caused to undergo transmission by isochronous packet. The channel is used for carrying out discrimination of desired packet from plural isochronous packets caused to undergo transmission on the IEEE 1394 serial bus and receiving it. The t code (tcode) is transaction code and value indicating that corresponding transfer is isochronous transfer is inserted thereinto. Odd/Even bit gives time change information which is one of information which provide basis of calculation of contents key Kc. The duplication control information indicates whether or not duplication of contents data is permitted. The synchronous code sy is used for carrying out transmitting/receiving operation of synchronous information between the transmitting side and the receiving side, and is used for taking synchronization of contents data stored in the data field such as video data and audio (speech) data, etc.

The header CRC is area into which CRC (Cyclic Redundancy Code) with respect to data stored in the header is stored. Check of transmission error of header is carried out on the basis of the header CRC.

The data field is a field into which contents data such as video data or audio (speech) data, etc. are stored.

The data CRC is an area into which CRC (Cyclic Redundancy Code) with respect to data stored in the data field is stored. On the basis of the data CRC, check of transmission error of data is carried out.

Further, the data receiving unit 20 receives contents data through the input/output interface 24, whereby when such data can be recorded, it records such data onto recording medium such as magnetic tape or magneto-optical disc, etc. by the media access section 26.

In addition, in the case where the data receiving unit 20 receives contents data of recording prohibition, it simply outputs, without recording such data onto recording medium by the media access section 26, music data from an audio (speech) output terminal 26A and outputs video data from a video output terminal 26B.

In this data receiving unit 20, the CPU 22 is adapted to become operative in accordance with control program stored in the memory 23 to carry out various control operations such as recording operation and reproducing operation, etc. by the media access section 26 with respect to the recording medium in accordance with operation information inputted through the user interface 25.

In this data transmission system, the contents data is ciphered by cipher key (contents key Kc) in a manner stated below and is stored into data field of isochronous packet, and is caused to undergo transmission along with Odd/Even bit which provides time change information (time change value Nc) stored in the header of that isochronous packet and duplication control information indicating whether or not duplication of contents data is permitted.

Namely, the data transmitting unit 10 and the data receiving unit 20 constituting data transmission system respectively have in advance individual or common secrete information. Namely, in the case of the open key system, such units have individual secrete information. In the case of the common key system, they have common secrete information. For example, keys for equipment given from the key management organization when respective equipments are manufactured are provided within respective equipments. In this case, they are assumed to have common secrete information as key for equipment. Moreover, respective equipments preserve, within the equipment, constant of n (e.g., n=64) bits corresponding to respective states of duplication control information given from the key management organization. Namely, respective equipments originally have constant Ca corresponding to duplication control information indicating copy prohibition "11" (Copy-never), constant Cb corresponding to duplication control information "10" indicating copy permissible with respect to only one generation (Copy-one-generation), constant Cc indicating that contents which were in "Copy-one-generation" state are once recorded contents and corresponding to duplication control information "01" (No-more-copies) indicating copy prohibition more than that, and constant Cd corresponding to duplication control information "00" (Copy-freely) indicating no copy limitation.

The data transmitting unit 10 is operative, in transmitting data, to generate two random numbers of, e.g., m bits to allow one to be exchange key Kx sent to the data receiving unit 20 in execution of authentication/key shared protocol and to allow the other to be initial value of time change value Nc used in data transmission. The exchange key Kx is one of information serving as basis of calculation of contents key Kc, and is sent from the data transmitting unit 10 to the data receiving unit 20 by using key shared by authentication/key shared protocol. Further, in transmitting data, duplication control information is written into packet header in correspondence with that data. Then, the exchange key Kx, time change value Nc (time change information stored into header of isochronous packet) and the duplication control information are used to calculate contents key Kc to cipher data by using contents key Kc to store ciphered data into data field of isochronous packet to transmit it to the transmission path along with packet header.

When, e.g., the duplication control information is "10", the contents key Kc is calculated as follows, for example.

Kc=J[Kx, Nc, Cb]

In this case, the function J is a function (one directional function) in which it is difficult to determine input from output. As a more practical example of the function J, there may be used, e.g., SHA (Secure Hash Algorithm)-1 of FIPS, (Federal Information Processing Standard) 180-1. In addition, the function J may be constituted by using block cryptography of DES (Data Encryption Standard), etc.

In the case where SHA-1 is used, bit connection (Kx∥Nc∥Cb) of Kx, Nc, Cb is inputted to SHA-1. It is to be noted that, as occasion demands, output of function J (160 bits in the case where, e.g., SHA-1 is used) is extended or contracted into the number of key bits of cryptographic algorithm (56 bits e.g., in the case of DES) to allow it to be contents key Kc. In the case where extension is made, it is sufficient to repeatedly arrange outputs plural times, for example. In the case where contraction is made, only necessary number of bits of high order or low order are used.

The cryptographic technology such as DES or SHA-1, etc. is explained in detail in "Applied Cryptography (Second Edition), Wiley" by Bruce Schneier.

Further, the data transmitting unit 10 sets value of Odd/Even bits of data packet in correspondence with time change value Nc. For example, setting is made such that values of the least significant bit of time change value Nc and Odd/Even bit are in correspondence with each other. In this case, the data transmitting unit 10 updates time change value Nc by the time condition, e.g., 30 sec. to 2 minutes, etc., or the condition of data quantity such as the number of packets or the number of bytes of data transmitted from transmission start or the last updating. The updating of the time change value Nc is carried out by making increment with a predetermined time interval or quantity of transmission being as timing. Further, contents key Kc is newly calculated in accordance with updating of time change value Nc to cipher contents by this contents key Kc to store the ciphered contents into packet. In addition, value of Odd/Even bits of data packet is changed.

Figure 4:
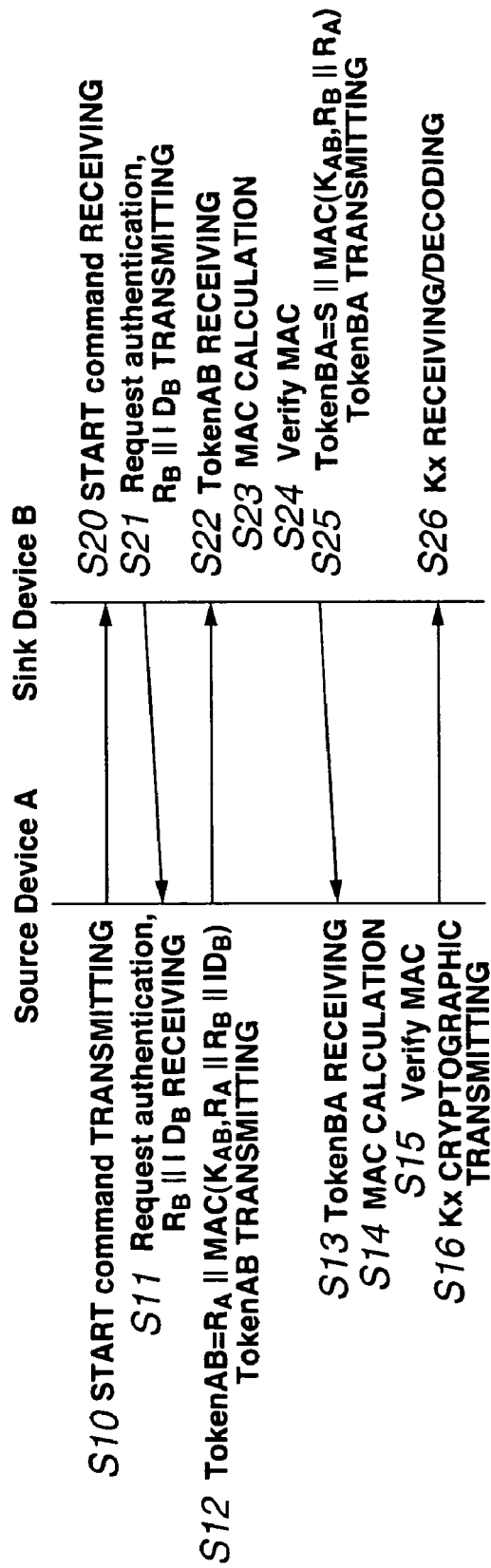
FIG. 4 is a flowchart showing execution procedure of authentication/key shared protocol in the data transmission system.
Figure 5:
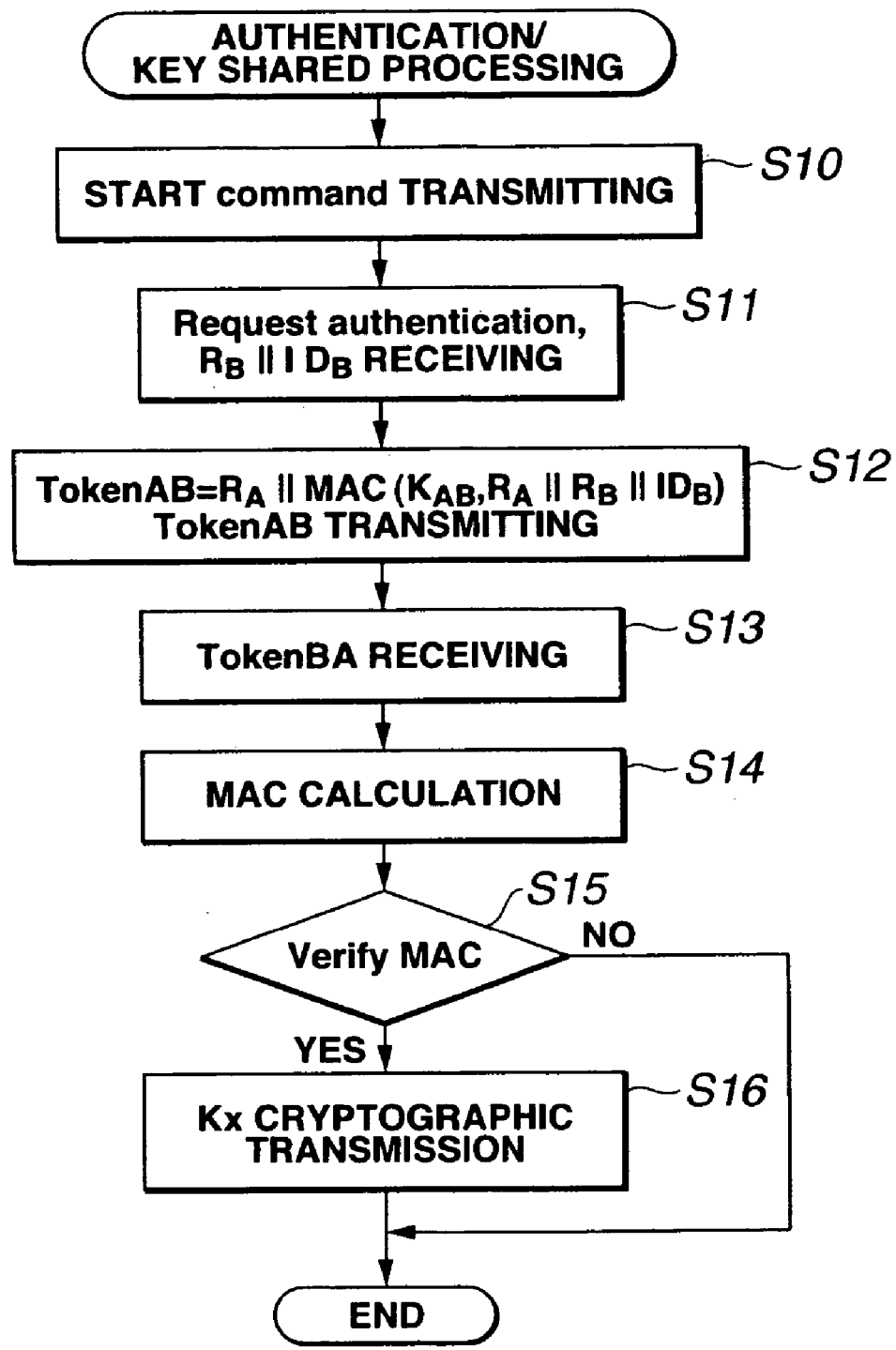
FIG. 5 is a flowchart showing processing procedure of the data transmitting unit side in the authentication/key shared protocol.
Figure 6:
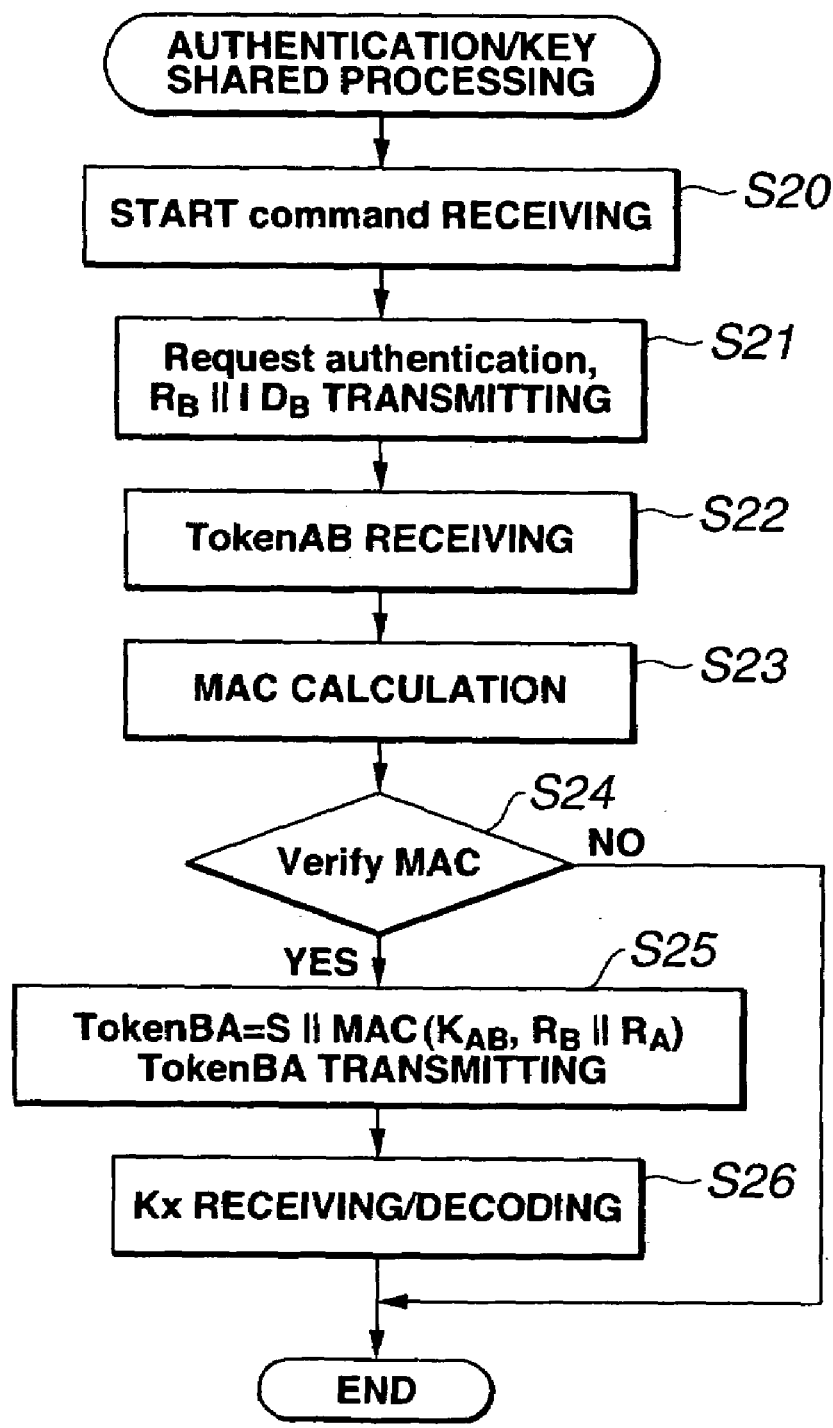
FIG. 6 is a flowchart showing processing procedure of the data receiving unit side in the authentication/key shared protocol.

In this data transmission system, prior to the above-mentioned data transmission, protocol for authenticating both equipments and for sharing the cipher key is executed between the data transmitting unit 10 and the data receiving unit 20. In more practical sense, after authentication/key shared protocol as shown in the flowchart of FIG. 4 is executed, data transmission is carried out. The processing procedure of the data transmitting unit 10 side in this data transmission system is shown in the flowchart of FIG. 5 and the processing procedure of the data receiving unit 20 side is shown in the flowchart of FIG. 6.

In this example, in FIG. 4 showing the authentication/key shared protocol, the data transmitting unit 10 is represented by Source Device A and the data receiving unit 20 is represented by Sink Device B.

Further, in this data transmission system, CPU 12 of the data transmitting unit 10 first transmits, to the data receiving unit 20, through the transmission path 30, start command for starting transmission of data from the input/output interface 16 (step S10).

The CPU 22 of the data receiving unit 20 is operative so that when it receives START command sent from the data transmitting unit 10 through the transmission path 30 connected to the input/output interface 24 (step S20), it generates random number $R_B$ of m (e.g., m=64) bits to transmit bit connection ($R_B \| D_B$) of this random number $R_B$ and identifier $ID_B$ of the data receiving unit 20, through the input/output interface 24, to the data transmitting unit 10 along with start request (Request authentication) of the authentication/key shared protocol (step S21).

When the CPU 12 of the data transmitting unit 10 receives start request (Request authentication) of authentication/key shared protocol and bit connection ($R_B \| D_B$) sent from the data receiving unit 20 through the transmission path 30 connected to the input/output interface 16 (step S11), it generates random number $R_A$ of m bits to determine first authentication information Token AB by the operation (arithmetic) processing expressed below.

Token $AB=R_A \| MAC\ (K_{AB},\ R_A \| R_B \| ID_B)$ to transmit the first authentication information Token AB to the data receiving unit 20 through the input/output interface 16 (step S12). In this case, MAC is Message Authentication Code prepared by the system described in ISO/IEC 9797. As cryptographic function, DES is used. In addition, $K_{AB}$ is secret information shared between the data transmitting unit 10 and the data receiving unit 20. Namely, $K_{AB}$ is key for equipment given from the key management organization as described above.

When the CPU 22 of the data receiving unit 20 receives the first Authentication information Token AB from the data transmitting unit 10 (step S22), it individually calculates MAC by using $K_{AB}$, $R_A$, $R_B$, $ID_B$ (step S23) to confirm or verity that MAC is in correspondence with received MAC (step S24). If MAC is not in correspondence with the received MAC at this step S24, the CPU 22 of the data receiving unit 20 judges that the data transmitting unit 10 is unfair equipment to complete Authentication/key shared protocol.

Then, the CPU 22 of the data receiving unit 20 generates random number S of m bits to determine second authentication information Token BA by the operation (arithmetic) processing as described below.

Token $BA=S \| MAC\ (K_{AB},\ R_B \| R_A)$ to send the second authentication information Token BA to the data transmitting unit 10 through the input/output interface 24 (step S25). It is to be noted that it is sufficient that the above-mentioned random number S is not m bits which are the same as the random number $R_B$. In this example, at the CPU 22 of the data receiving unit 20, high order m bits of MAC ($K_{AB}$, S) are used as temporary key which will be described below.

When the CPU 12 of the data transmitting unit 10 receives the second authentication information Token BA from the data receiving unit 20 (step S13), it individually calculates MAC by using $K_{AB}$, $R_A$, $R_B$ (step S14) to confirm or verify that MAC is in correspondence with received MAC (step S15). If MAC is not in correspondence with the received MAC at the step S15, the CPU 12 of the data transmitting unit 10 judges that the data receiving unit 20 is unfair equipment to complete authentication/key shared protocol. On the other hand, if MAC is in correspondence with the received MAC at this step S15, the CPU 12 of the data transmitting unit 10 authenticates that the data receiving unit 20 is proper equipment to use high order m bits of MAC ($K_{AB}$, S) as temporary key which will be described below.

It is to be noted that while high order m bits of MAC ($K_{AB}$, S) are used as the temporary key, it is not required that the number of bits thereof is the same as the number of bits m which is the same as the random number S.

Then, the CPU 12 of the data transmitting unit 10 ciphers exchange key Kx by the temporary key by using, e.g., DES cryptographic function to transmit the ciphered exchange key Kx to the data receiving unit 20 through the input/output interface 16 (step S16).

Then, the data receiving unit 20 decodes, by the temporary key, by using DES decode function, ciphered exchange key Kx sent from the data transmitting unit 10 to obtain exchange key Kx (step S26).

The data receiving unit 20 in this data transmission system can calculate, similarly to the data transmitting unit 10, contents key Kc from exchange key Kx and time change value Nc obtained by executing authentication/key shared protocol between the data receiving unit 20 and the data transmitting unit 10 and constant (Cb in this example) corresponding to duplication control information of data packet, and can thus decode data by using such contents key Kc.

Figure 7:
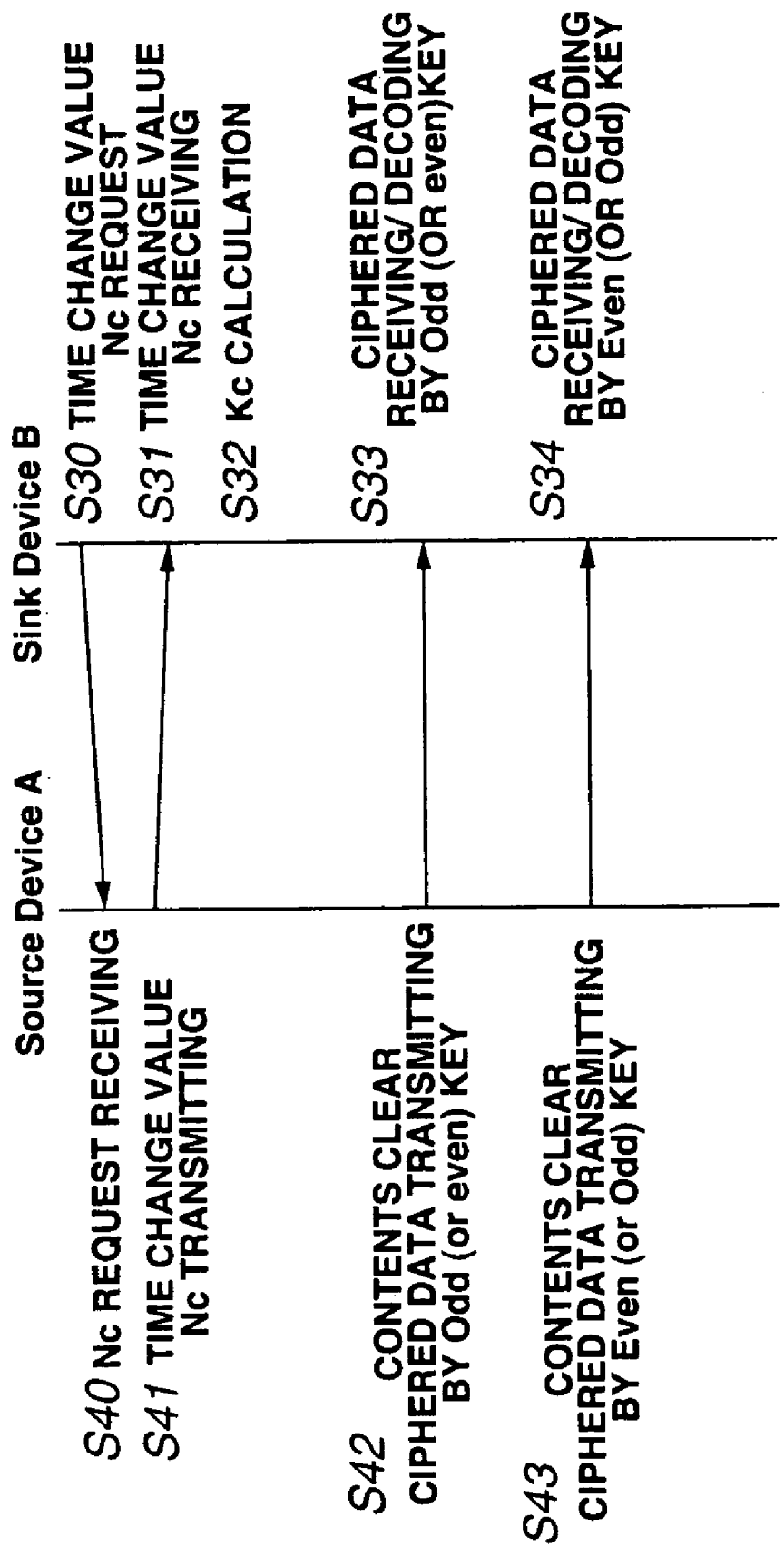
FIG. 7 is a flowchart showing procedure of data transmission processing in the data transmission system.
Figure 8:
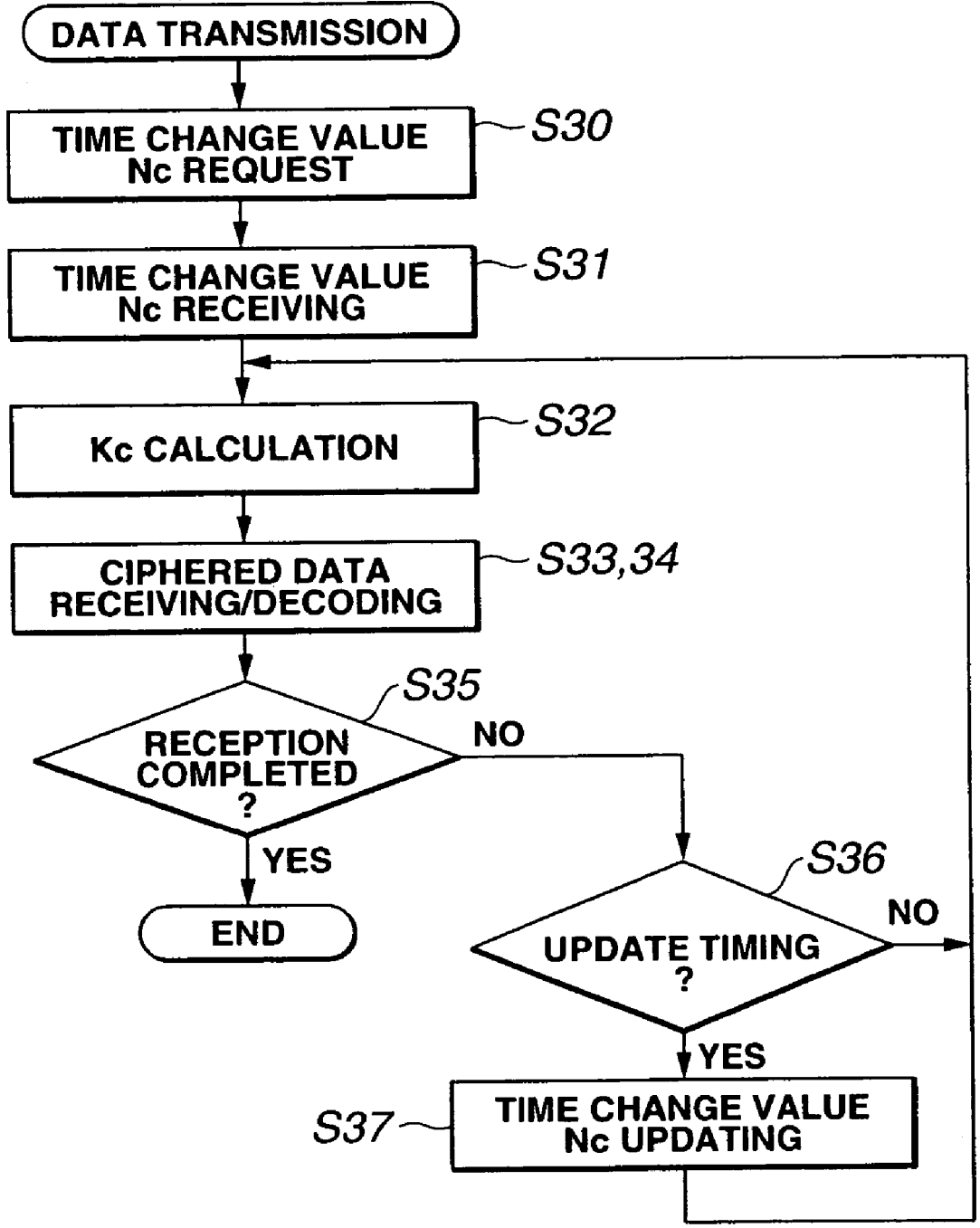
FIG. 8 is a flowchart showing processing procedure of the data receiving unit side in the data transmission processing.
Figure 9:
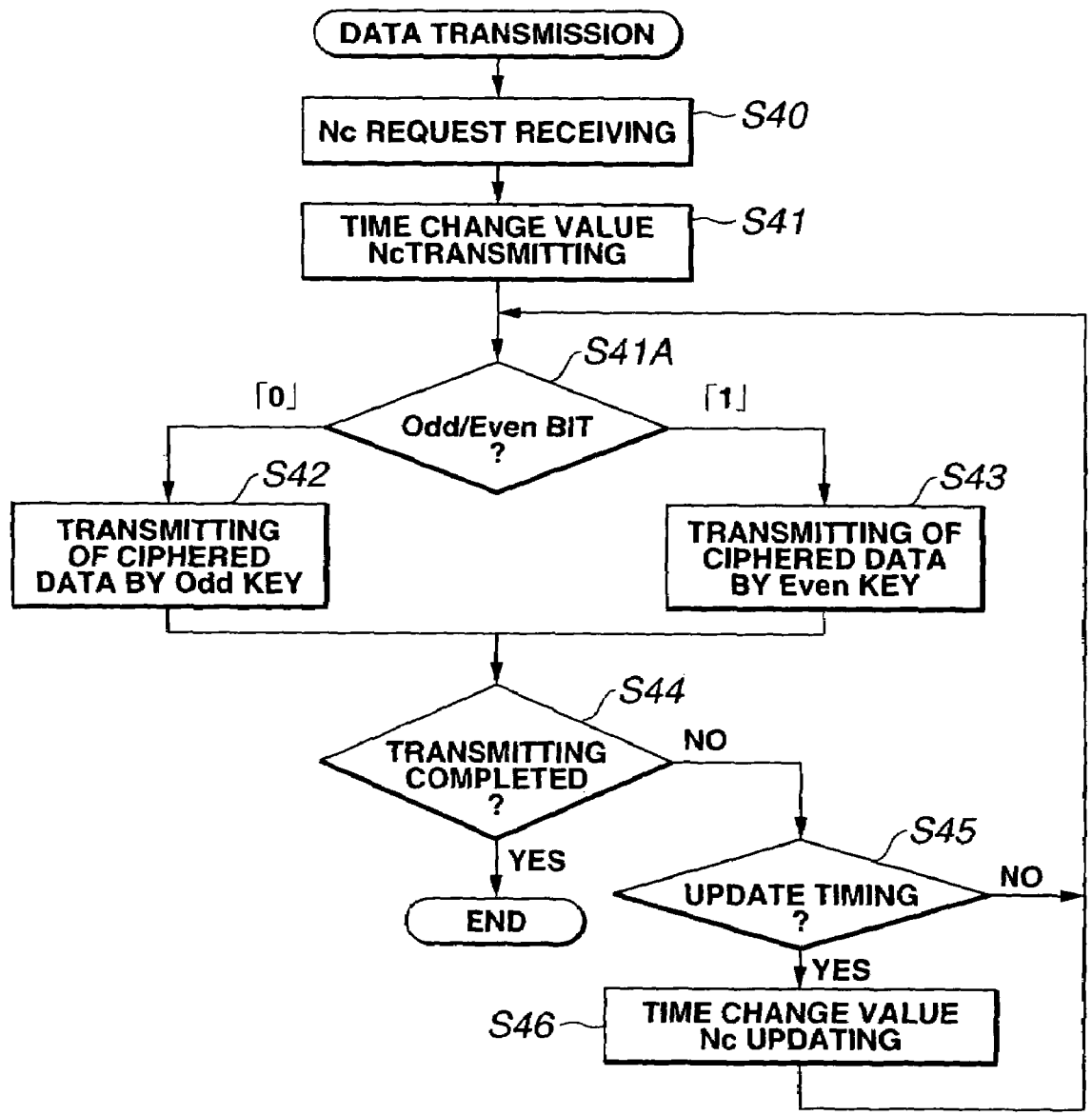
FIG. 9 is a flowchart showing processing procedure of the data receiving unit side in the data transmission processing.

In this data transmission system, after authentication/key shared protocol is executed, data transmission is carried out in accordance with procedure as shown in the flowchart of FIG. 7. The processing procedure of the data receiving unit 20 side in this data transmission system is shown in the flowchart of FIG. 8 and the processing procedure of the data transmitting unit 10 side is shown in the flowchart of FIG. 9.

Namely, the CPU 22 of the data receiving unit 20 which has obtained exchange key Kx by the authentication/key shared protocol then requests data transmitting unit 10 to send current time change value Nc (step S30).

When the CPU 12 of the data transmitting unit 10 receives this Nc request (step S40), it transmits current time change value Nc to the data receiving unit 20 in accordance with this request (step S41), and the data receiving unit 20 receives this time change value Nc (step S31).

The data receiving unit 20 confirms whether or not the least significant bit of time change value Nc sent from the data transmitting unit 10 and Odd/Even bit in the data packet are equal to each other, whereby when both values are equal to each other, it. calculates contents key Kc from the time change value Nc, the exchange key Kx and the constant Cb (step S32). In the case where the least significant bit of the time change value Nc and Odd/Even bit in the data packet are not equal to each other, the data receiving unit 20 judges that the contents key Kc has been already updated to take, as new time change value Nc, value obtained by incrementing time change value Nc sent to calculate contents key Kc.

In this example, after time change value Nc is sent from the data transmitting unit 10 to the data receiving unit 20 in accordance with the Nc request, since the data transmitting unit 10 and the data receiving unit 20 recognize that updated value of the next time change value Nc is value obtained by incrementing current value, it is possible to calculate contents key Kc used next in advance.

Then, the data transmitting unit 10 ciphers contents data such as video data or audio (speech) data, etc. by cipher key (contents key Kc) to store the ciphered contents data into data field of isochronous packet to sequentially transmit such data along with Odd/Even bit which provides time change information stored in the header of that isochronous packet and duplication control information of contents data (steps S42, S43).

Namely, at the data transmitting unit 10, setting state of Odd/Even bit corresponding to, e.g., time change value Nc is judged (step S41A). When Odd/Even bit=0, ciphered data obtained by ciphering contents data by contents key Kc (Odd key) corresponding to Odd/Even bit=0 is transmitted (step S42). On the other hand, when Odd/Even bit=1, such a processing is carried out to transmit ciphered data obtained by ciphering contents data by contents key Kc (Even key) corresponding to Odd/Even bit=1 (step S43). Further, whether or not transmitting processing is completed is judged (step S44). If its judgment result is NO, i.e., transmitting processing is not completed, whether or not updating timing of time change value Nc is provided is judged (step S45). When updating timing is not provided, the processing returns to the judgement processing (step S41A) of setting state of the Odd/Even bit without updating time change value Nc. When updating timing is provided, the time change value Nc is incremented to thereby update it and to update Odd/Even bit (step S46). Thus, the processing returns to the judgment processing (step S41A) of setting state of the Odd/Even bit to thereby repeatedly carry out transmitting processing (step S42) of ciphered data obtained by ciphering contents data by contents key Kc (Odd Key) corresponding to the Odd/Even bit=0 and transmitting processing (step S43) of ciphered data obtained by ciphering contents data by contents key Kc (Even key) corresponding to Odd/Even bit=1.

Further, when there results YES of judgement processing (step S44) as to whether or not the transmitting processing has been completed, i.e., completion (end) of transmitting processing, processing of data transmission mode is completed.

When the data receiving unit 20 receives ciphered data sent from the data transmitting unit 10 in a manner as stated above, it decodes data by using the calculated contents key Kc (steps S33, S34).

Namely, at the data receiving unit 20, whether or not completion (end) of reception is carried out is judged (step S35) every time receiving/decode processing of ciphered data is carried out (steps S33, S34). When its judgment result is NO, i.e., completion (end) of reception does not result, whether current timing reaches update timing of time change value Nc (step S36). When current timing is not the update timing, the processing returns to the calculation processing (step S32) of the contents key Kc without updating the time change value Nc. When current timing reaches the update timing, the time change value Nc is incremented to thereby update it (step S37). The processing procedure returns to the calculation processing (step S32) of the contents key Kc to thereby repeatedly carry out receiving/decode processing (step S33) of ciphered data corresponding to the Odd/Even bit=0 and receiving/decode processing (step S34) of ciphered data corresponding to the Odd/Even bit=1.

The data receiving unit 20 decodes data by using the calculated contents key Kc, thereby making it possible to enable or inhibit recording of data in correspondence with duplication control information stored in the data packet.

It is to be noted that while, in the above-described embodiment, explanation has been given in connection with the data transmission system where the number of data receiving units 10 is one, this invention can be applied as it is also in the case where plural data receiving units exist.

In the data transmission system of such a configuration, e.g., in the case where duplication control information of packet header of data packet is transmitted at "11" signifying copy inhibit from the data transmitting unit 10 side, when there is duplication control information altering attack in transmission so that duplication control information is altered to "10" indicating permission of once copy, contents key Kc is calculated by using constant Cb corresponding to duplication control information "10" of this data at the data receiving unit 20 side which has received this packet to decode contents data by using this contents key Kc.

Since cryptography of contents data at the data transmitting unit 10 side is carried out by contents key Kc calculated by using constant Ca corresponding to duplication control information "11", data obtained as the result of decoding at the data receiving unit 20 side becomes insignificant data. Namely, since data appearing at the data receiving unit 20 is not original contents data, if such data is recorded, there is no meaning. Therefore, there is no possibility that generation control of copy may be demolished or corrupted.

Moreover, in this data transmission system, since time change value Nc is caused to act on the contents key Kc, such time change value Nc is frequently changed, thereby making it possible to limit quantity of data to be ciphered by using the same cipher key. Thus, the possibility of decipherment can be lessened.

Further, updating of time change value Nc is carried out by increment to carry out transmission in the state where value corresponding to time change value currently used is stored in the data packet, thereby making it possible to easily recognize updating of time change value Nc at the data receiving unit 20 side, and the data transmitting unit 10 and the data receiving unit 20 can both calculate correct contents keys Kc in advance.

Thus, there is no necessity that the data receiving unit 20 inquires time change value Nc with respect to the data transmitting unit 10 every time updating of time change value Nc is provided. Thus, suppression of quantity of communication as the entirety of the system and simplification of control software can be realized.

In addition, since one directional function in which it is difficult to determine input from output is used in calculating contents key Kc, even if the above-mentioned contents key Kc is revealed, there is no possibility that constant corresponding to exchange key Kx and/or duplication control information may be unfairly determined. Accordingly, even if a certain contents key Kc is revealed, there is no possibility that contents data ciphered by using different contents key Kc may be deciphered.

As described above, in the preferred embodiment of this invention, in carrying out unidirectional transmission of data from the data transmitting unit to the data receiving unit, such an approach is employed to generate cipher key by first information shared in secrete between the data transmitting unit and the data receiving unit, second information derived from duplication control information of transmit data and third information serving as time change information shared between the data transmitting unit and the data receiving unit to cipher data by using such cipher key to transmit, from the data transmitting unit, transmit data in which the duplication control information and the time change information are added to the ciphered data. Thus, the data receiving unit side receives ciphered data in which duplication control information and time change information are added, which is sent from the data transmitting unit, to generate cipher key by first information shared in secret between the data receiving unit and the data transmitting unit, second information derived from duplication control information of the received data and third information serving as time change information shared between the data receiving unit and the data transmitting unit, thus making it possible to decode the received data by using this cipher key.

As stated above, such an approach is employed to allow second information derived from duplication control information of the transmit data to act on cipher key of transmit data, whereby in the case where duplication control information is altered by duplication control information altering attack during transmission, since cipher key calculated on the basis of the second information corresponding to duplication control information of data received at the data reproducing unit side is different from cipher key used at the data transmitting side, received data cannot be normally decoded, resulting in no possibility that generation management of copy would be demolished or corrupted.

Moreover, since time change information is caused to act on the cipher key, this time change information is frequently changed, thereby making it possible to limit quantity of data ciphered by using the same cipher key. Thus, the possibility of deciphering can be reduced.

Further, updating of time change information is carried out by increment and transmission is carried out in the state where value corresponding to time change information currently used is stored in the data packet, thereby making it possible to easily recognize updating of time change information at the data receiving unit side, and the data transmitting unit and the data receiving unit can both calculate in advance correct cipher key. Thus, there is also no necessity that the data receiving unit inquires time change value Nc with respect to the data transmitting unit 10 every time updating of time change information takes place. Accordingly, suppression of quantity of communication as the entirety of the system and simplification of control software can be realized.

In addition, since one directional function in which it is difficult to determine input from output is used in calculating the cipher key, even if the above-mentioned cipher key is revealed, there is no possibility that first information shared in secrete between the data transmitting unit and the data receiving unit and/or second information corresponding to duplication control information may be unfairly determined. Accordingly, even if a certain cipher key is revealed, there is no possibility that data ciphered by using different cipher key may be deciphered.

The invention claimed is:

1. A computer-readable medium encoded with a transmission signal caused to undergo decode processing at a unit for decoding ciphered data, the transmission signal having the structure comprising:
   header consisting of duplication permission information indicating permission state of duplication of data and time change information updated every predetermined time, wherein the transmission signal is selected from a desired channel of a satellite digital multi-channel broadcast signal, and
   data ciphered by using cipher key based on the duplication permission information and the time change information.

* * * * *